United States Patent [19]
Loving et al.

[11] Patent Number: 5,955,162
[45] Date of Patent: Sep. 21, 1999

[54] CALCIUM ALUMINA CEMENT LINED PIPE

[75] Inventors: C. Gilmer Loving, Madison Heights; Steven Farkas, Lynchburg, both of Va.

[73] Assignee: AMSTED Industries Incorporated, Chicago, Ill.

[21] Appl. No.: 08/697,076

[22] Filed: Aug. 19, 1996

Related U.S. Application Data

[62] Division of application No. 08/270,009, Jul. 1, 1994, Pat. No. 5,585,141.

[51] Int. Cl.⁶ ............................................... F16L 11/08
[52] U.S. Cl. .................. 428/34.5; 428/34.7; 277/207 A; 138/109; 138/143; 138/144; 138/155; 138/175; 138/DIG. 6; 285/31; 285/55; 285/230; 285/231
[58] Field of Search ................................ 428/34.5, 34.7; 277/207 A; 138/109, 143, 144, 155, 175, DIG. 6; 285/31, 55, 230, 231

[56] References Cited

U.S. PATENT DOCUMENTS 3,682,676  8/1972  Karrh et al. ........................ 117/16
4,361,336  11/1982  Reeh et al. ........................ 277/207 A

OTHER PUBLICATIONS

Derwent Abstract 87–000957 (01), Jan. 1987.

Chemical Abstract 70:99322, Jan. 1969.

*Primary Examiner*—Frederick Krass
*Attorney, Agent, or Firm*—Edward J. Brosius; F.S. Gregorczyk; Stephen J. Manich

[57] ABSTRACT

Cast iron pipe and other elongated hollow articles are lined with a cementitious mortar for certain applications, such as the transmission of potable water or sewage. To improve the resistance to attack from acids and to provide a crack and holiday free cement lining, a calcium alumina cement is used to line the article. A plasticizer such as fireclay is added to the calcium alumina cement prior to its application. The cement lined article is then coated with an asphaltic based coating and then cured in a high humidity environment.

6 Claims, 1 Drawing Sheet

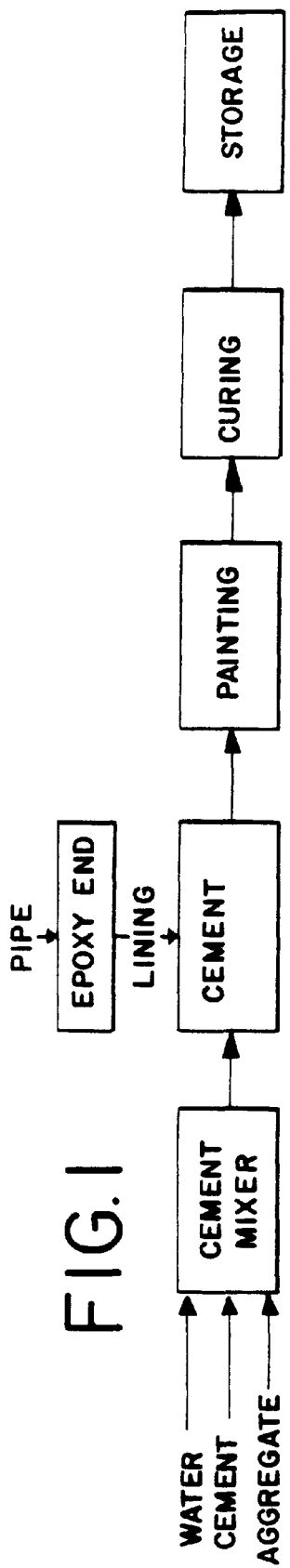
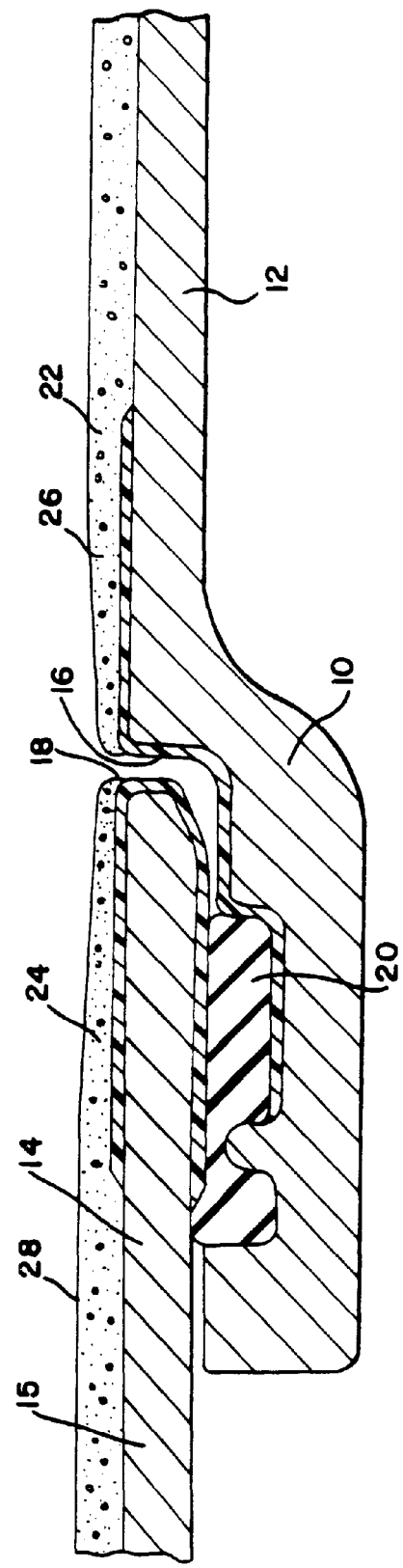

CALCIUM ALUMINA CEMENT LINED PIPE

This is a division of application Ser. No. 08/270,009 filed on Jul. 1, 1994, now U.S. Pat. No. 5,585,141.

BACKGROUND OF THE INVENTION

This invention relates generally to the coating of a cylindrical elongated object with a cementitious mortar, and, more specifically, to the coating of the inside surface of a cast iron pipe with a high alumina cement. The cast iron pipe may be made of either gray iron or ductile iron. The cement may utilize a plasticizer such as fireclay, and also is coated with an asphaltic based coating prior to curing.

It is known to line the interior surface of cast iron pipe with a cementitious mortar or cement lining for the transmission of potable water, such cement lining also may be coated with an asphaltic based coating. Because exposure to potable water is not as severe service as exposure to sewage, the major concern with such cement and asphaltic based coated cast iron pipe is corrosion protection. Accordingly, the major goal is to provide a substantially crack free and holiday free cement lining and also an impervious coating on such cement lining. However, in applications of such lined cast iron pipe for sewer use, the exposure environment is quite more severe and the potential for an acidic environment, in the low pH range, is possible. Accordingly, the concerns about corrosion increase tremendously in such service.

It is also known to line the interior of cast iron pipes with calcium alumina cement. However, such cement linings are known to be prone to cracking leading to corrosion of the cast iron pipe, especially in a sewer environment.

In response to the demands of such sewer service, some cast iron pipes for such service have been lined with a plastic or polyethylene coating. Such a coating can provide good resistance to corrosion, but is quite expensive. There is also a concern regarding the ability of such plastic linings to adhere to the internal surface of the cast iron pipe. However, even such plastic lined pipe is subject to small holidays which can permit the acid environment to contact the cast iron pipe and thereby lead to corrosion.

One solution to this problem is disclosed in U.S. Pat. No. 5,037,600, which discloses the lining of a cast iron pipe with a polyolefin-cement mixture thereby assuring the adherence of the mixture to the internal surface of the pipe. A second polyolefin coating is then applied on top of the polyolefin-cement mixture to complete the lining. Such a lining arrangement has shown to be successful, but is rather expensive to produce.

Another problem with such mixtures is the need to treat the ends of the pipe which are joined in well-known gasket type joints. The tolerances in such pipe end joints are such that the cement coating cannot be applied to the interior of the pipe bell and still leave the bell capable of accepting the end from the adjoining pipe.

SUMMARY OF THE INVENTION

It is an object of the present invention to provide an improved cement lined cylindrical article that is especially resistant to corrosion.

It is another object of the present invention to provide a calcium alumina cement lined cast iron pipe that includes a coating of an asphaltic based material on the inside surface of the cement lining to further improve the corrosion resistant properties.

It is another object of the present invention to provide a calcium alumina cement lined cast iron pipe wherein plasticizers are used with the cement and an asphaltic based coating is also applied to the interior surface of the cement lining.

The present invention relates to a method of and the resulting product resulting from the lining of a cast iron pipe or similar cylindrical object with a calcium alumina cement lining. Calcium alumina cement mortar is prepared which also comprises a coarser calcium alumina cement as an aggregate and a plasticizer such as fireclay. The mortar is applied to the interior surface of the cylindrical object at or somewhat above room temperature in the known fashion of injection combined with rotation of the cylindrical object. Prior to the application of the mortar to the interior surfaces of the cylindrical object or pipe, the bell end interior and the exterior and interior pipe end are coated with a highly corrosion resistant paint such as epoxy, thereby protecting such ends from corrosion.

The pipe after such cement coating is then coated with an asphaltic based coating placed in the usual spraying manner on the inside surface of the cement lining. The asphaltic based coating has been found to perform better if it is further modified by a gel component. The pipe, after such coating, is then cured in a saturated atmosphere at an elevated temperature.

The result of this operation is a cement lined pipe that is substantially crack free and holiday free and highly resistant to corrosion, even when utilized in a severe service such as a sewer application.

BRIEF DESCRIPTION OF THE DRAWINGS

In the drawings:

FIG. 1 is a flow diagram for the process of the present invention as applied to cast iron pipe, and FIG. 2 is a cross sectional view of a cement coated cast iron pipe at a joint section with another cast iron pipe both coated in accordance with the present invention.

DETAILED DESCRIPTION OF THE INVENTION

The present invention provides a method of lining an elongated cylindrical object such as the cast iron pipe with a cement mixture to provide a substantially crack free and holiday free internal lining. The preferred cement mixture utilized in the present invention is a calcium alumina cement with a coarser calcium alumina cement used as an aggregate. The sieve size of the aggregate is typically 8 to 200, as measured in accordance with ASTM E11. A plasticizer such as fireclay is also desirable to be used with the cement mixture to assure a crack free lining.

The method of the present invention is diagrammed in FIG. 1 of the drawings. The mixture of 20–50% by weight of calcium alumina cement, 50–80% by weight coarser calcium alumina cement as an aggregate, water at 10–30% by weight, and a plasticizer at 2 to 8% by weight is added to a cement mixer. The plasticizer is typically fireclay. If the cylindrical object to be lined is a cast iron pipe, the cast iron pipe first is coated at its ends with a high solid, polyamid epoxy to impart corrosion resistance to the ends of the pipe. One polyamid epoxy that has performed well in this application is a Series 61 TNEME-liner provided by the TNEMEC Company Incorporated of Kansas City, Mo. The epoxy end coating application can be seen in FIG. 2 which shows the bell end 10 of a first pipe 12 joined to the spigot end 14 of a second pipe 15. Epoxy coating 16 is applied to the inside of bell end 10 and epoxy coating 18 is applied to the spigot end on both the interior and exterior side of second the pipe. In both cases, the epoxy is first applied in a first coat and allowed to dry. A second coat of the epoxy is then applied and a calcium alumina cement is sprinkled onto the wet epoxy and then is allowed to dry. The pipe is then passed into the cement lining operations shown in FIG. 1. This cement lining operation is a known operation in cast iron pipe manufacture, wherein the cement mixture is applied to the interior surface of the pipe while the pipe is rotated.

In the present invention, the cement mixture described above is pumped and then centrifugally spread onto the interior surface of the cast iron pipe to provide a lining shown as 22 on the interior surface of pipe 12 and as lining 24 on the interior surface of pipe 15. As can be seen from FIG. 2, in a typical joint application, elastomeric gasket 20 is utilized to form a water tight seal between the spigot end 14 of pipe 15 and the bell end 10 of pipe 12. As can also be seen from FIG. 2, any water or sewer materials having a potentially corrosive characteristic would either contact the cement lining 22, or, in the small gap between pipe 12 and pipe 14, the epoxy coating 16 on the interior surface of pipe 12 or the epoxy coating 18 on the end and exterior surface of pipe 15. Accordingly, a thorough protective lining is provided for the cast iron pipe joint.

The next step in the manufacturing operation is the painting operation wherein the cement lined pipe is coated on its interior surface with an asphalt based bituminous paint. One such paint known to be particularly applicable to this use is Sealcoat, provided by the Triple G Company of Riverton, N.J. However, it has been determined that the asphalt based bituminous paint performs better if a gel is added to the paint to provide a modified coating. Such a modified paint provides a thick, heavy, holiday free coating to the interior surface of the cement lining.

The paint would form the coating 26 on the interior surface of cement 22 and the coating 28 on the interior surface of cement lining 24.

The final step in manufacturing a cast iron pipe in accordance with the present invention is to cure the cement lined and coated or painted pipe. It has been found that such curing should be done in a fully saturated environment, typically at an elevated temperature of 90–160° F. The saturated air allows the extremely high humidity, fully water saturated air atmosphere for the cement lining in the pipe to cure in a controlled fashion to assure a substantially crack free lining. It is also an important function of the paint coating operation to occur prior to the curing as such operation assures moisture retention over a period of time to allow for a substantially crack free cement lining. The curing is typically done in a curing chamber allowing the humidity and the temperature to be properly controlled.

One critical area of the process of cement lining the pipe or similar objects in accordance with the present invention is the temperature range of the cement mixture. It is desired that the range be between 60–100° F., and preferably 80° F. It is also desirable that the amount of water added to the mix lead the mix in a pumpable state allowing the mix to flow readily and evenly on the interior of the surface to be lined.

Another critical part of the present invention is the amount of retained moisture in the cement lining prior to painting and curing. It is not desirable to deplete all the moisture or nearly all the moisture because hydration is a chemical reaction requiring a degree of moisture. The preferred rotation speeds and times discussed in the examples of the present case have been rather successful in retaining the appropriate amount of moisture. The degree of moisture retention is about 8–15%. The rotation speed to accomplish this is between 200–800 rpm and the time of such rotation is between 5 and 60 seconds depending on pipe diameter.

The paint coating on the cement is important because the paint acts as a moisture retaining barrier to allow the complete hydration and curing of the cement. The paint seals in the moisture and must be performed prior to the curing step. Without painting, the moisture evaporates too rapidly in the curing step and leads to cracking of the cement lining.

The epoxy end coating operation should be performed in a dry environment at room temperature, typically between 55 and 100° F. It is important that the ends of the pipe are dry prior to such epoxy coating.

The plasticizer utilized in the examples set forth in this case is an aluminum silicate base fireclay. Other plasticizers that could be utilized include sodium gluconate, sugar, and citric acid.

EXAMPLE 1

A test was conducted on a 12 inch nominal diameter cast iron pipe of twenty foot length. The bell end and spigot end of the pipe were epoxy coated by first applying a high solid polyamid, in this case a series 61 TNEME-liner, and allowing it to dry. A second coat of the same epoxy was then applied and a calcium alumina cement was sprinkled onto the epoxy and then allowed to dry. A cement mixture was prepared with such mixture comprising 80% by weight calcium alumina cement and calcium alumina aggregate in a 35% cement/65% aggregate mixture. The cement mixture also included 4% by weight of fireclay and 16% by weight water. The temperature of this mixture was 80° F. The cement mixture was applied to the interior surface of the pipe, which was then rotated at 700 rpm for 40 seconds. This assured a desirable degree of moisture retained in the cement. The interior surface of the cement was then coated with an asphalt based bituminous gel containing paint, in this case provided by the Triple G Company of Riverton, N.J. The cement lined, painted pipe was then cured in a chamber of fully saturated air at 120° F. for four hours. A substantially crack free and holiday free cement lined painted pipe was provided by this operation.

EXAMPLE 2

A test was conducted on a 24 inch nominal diameter cast iron pipe of twenty foot length. The bell end and spigot end of the pipe were epoxy coated by first applying a high solid polyamid, in this case a series 61 TNEME-liner, and allowing it to dry. A second coat of the same epoxy was then applied and a calcium alumina cement was sprinkled onto the epoxy and then allowed to dry. A cement mixture was prepared with such mixture comprising 82% by weight calcium alumina cement and calcium alumina aggregate in a 35% cement/65% aggregate mixture. The cement mixture also included 4% by weight of fireclay and 14% by weight water. The temperature of this mixture was 80° F. The cement mixture was applied to the interior surface of the pipe, which was then rotated at 500 rpm for 10 seconds. This assured a desirable degree of moisture retained in the cement. The interior surface of the cement was then coated with an asphalt based bituminous gel containing paint, in this case provided by the Triple G Company of Riverton, N.J. The cement lined, painted pipe was then cured in a chamber of fully saturated air at 120° F. for four hours. A substantially crack free and holiday free cement lined painted pipe was provided by this operation.

EXAMPLE 3

A test was conducted on a 16 inch nominal diameter cast iron pipe of twenty foot length. The bell end and spigot end of the pipe were epoxy coated by first applying a high solid polyamid, in this case a series 61 TNEME-liner, and allowing it to dry. A second coat of the same epoxy was then applied and a calcium alumina cement was sprinkled onto the epoxy and then allowed to dry. A cement mixture was prepared with such mixture comprising 81% by weight calcium alumina cement and calcium alumina aggregate in a 35% cement/65% aggregate mixture. The cement mixture also included 4% by weight of fireclay and 15% by weight water. The temperature of this mixture was 75° F. The cement mixture was applied to the interior surface of the pipe, which was then rotated at 505 rpm for 8 seconds. This assured a desirable degree of moisture retained in the cement. The interior surface of the cement was then coated with an asphalt based bituminous gel containing paint, in this case provided by the Triple G Company of Riverton, N.J. The cement lined, painted pipe was then cured in a chamber of fully saturated air at 120° F. for four hours. A substantially crack free and holiday free cement lined painted pipe was provided by this operation.

We claim:

1. A cylindrical metallic body having an internal cementitious lining,
    said cylindrical metallic body having bell and spigot ends that are coated with an epoxy coating comprising a first layer of an epoxy and a second layer of an epoxy with a dry calcium alumina cement deposited thereon,
    said internal cementitious lining comprising calcium alumina cement and a plasticizer,
    and wherein a sealing coat is present on the inner surface of said cementitious lining.

2. The cylindrical body of claim 1 wherein said cementitious lining also comprises a coarser calcium alumina as an aggregate.

3. The cylindrical body of claim 1 wherein said cementitious lining plasticizer comprises fireclay.

4. The cylindrical body of claim 1 wherein said cementitious lining comprises calcium alumina cement at 20–50% by weight and water at 10–30% by weight.

5. The cylindrical body of claim 4 wherein said cementitious lining further comprises a coarser calcium alumina cement at 50–80% by weight as an aggregate.

6. The cylindrical body of claim 1 wherein said plasticizer is fireclay in the amount of 2–8% by weight.

* * * * *